United States Patent
Wu et al.

(10) Patent No.: US 11,490,321 B2
(45) Date of Patent: Nov. 1, 2022

(54) METHOD AND APPARATUS FOR BACKHAUL LINK SELECTION

(71) Applicant: Lenovo (Beijing) Limited, Beijing (CN)

(72) Inventors: Lianhai Wu, Beijing (CN); Jing Han, Beijing (CN); Haiming Wang, Beijing (CN); Hongmei Liu, Beijing (CN); Zhuoyun Zhang, Beijing (CN)

( * ) Notice: Subject to any disclaimer, the term of this patent is extended or adjusted under 35 U.S.C. 154(b) by 26 days.

(21) Appl. No.: 17/058,056

(22) PCT Filed: May 23, 2018

(86) PCT No.: PCT/CN2018/088062
§ 371 (c)(1),
(2) Date: Nov. 23, 2020

(87) PCT Pub. No.: WO2019/222945
PCT Pub. Date: Nov. 28, 2019

(65) Prior Publication Data
US 2021/0160764 A1    May 27, 2021

(51) Int. Cl.
*H04W 48/10* (2009.01)
*H04W 48/00* (2009.01)
*H04W 72/08* (2009.01)

(52) U.S. Cl.
CPC .......... *H04W 48/10* (2013.01); *H04W 48/17* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 9,306,679 B2* | 4/2016 | Nagata | .................. H04B 17/40 |
| 10,667,208 B2* | 5/2020 | Zhang | ............... H04W 28/0215 |
| 2016/0204847 A1* | 7/2016 | Ryu | .................... H04W 64/006 |
| | | | 455/7 |

FOREIGN PATENT DOCUMENTS

| | | |
|---|---|---|
| CN | 101848420 A | 9/2010 |
| CN | 103200088 A | 7/2013 |
| CN | 106454992 A | 2/2017 |
| CN | 106888494 A | 6/2017 |
| WO | 2016185285 A1 | 11/2016 |

OTHER PUBLICATIONS

PCT/CN2018/088062, "International Search Report and the Written Opinion of the International Search Authority" ISA/CN, State Intellectual Property Office of the P.R. China, dated Jan. 17, 2019, pp. 1-7.

* cited by examiner

*Primary Examiner* — Hong S Cho
(74) *Attorney, Agent, or Firm* — Kunzler Bean & Adamson

(57) ABSTRACT

The present disclosure relates to methods and apparatuses. According to some embodiments of the disclosure, a method comprises: receiving, at a communication device, a first broadcasting message from a base station, the first broadcasting message including a first information for backhaul link selection; determining a channel quality between the communication device and the base station; and determining to access either the base station or a candidate node according to the first broadcasting message and the channel quality.

15 Claims, 9 Drawing Sheets

METHOD AND APPARATUS FOR BACKHAUL LINK SELECTION

TECHNICAL FIELD

The present disclosure generally relates to wireless communication technology, especially for backhaul link selection in a wireless communication system.

BACKGROUND

In the 3rd Generation Partnership Project (3GPP), deployment of Relay Nodes (hereinafter referred to as RNs) in a wireless communication system is promoted. One of the main objectives for deploying RNs is to enhance coverage area of a Base Station (hereinafter referred to as BS) by improving throughput of a mobile device (also known as a user equipment (UE)) that locates in a coverage hole or far from the base station resulting in low signal quality.

In a wireless communication system employing RNs, a BS that can provide connection to at least one RN is called a Donor BS. A RN can access a Donor BS by using an attach procedure. The RN may hop through one or more RNs before reaching the Donor BS, or may be directly connected to the Donor BS. Therefore, during a startup procedure, the RN may need to determine whether to access the Donor BS or one of its neighboring RNs. There is a need for handling such backhaul link selection.

SUMMARY OF THE DISCLOSURE

One embodiment of the present disclosure provides a method, comprising: receiving, at a communication device, a first broadcasting message from a base station, the first broadcasting message including a first information for backhaul link selection; determining a channel quality between the communication device and the base station; and determining to access either the base station or a candidate node according to the first broadcasting message and the channel quality.

Another embodiment of the present disclosure provides a method, comprising: receiving, at a communication device, a broadcasting message including information indicating a threshold for backhaul link selection of a candidate node; accessing, at a communication device, a base station; and if the access to the base station fails, determining channel quality between the communication device and the candidate node, and determining to access the candidate node according to the threshold and the channel quality between the communication device and the candidate node.

Yet another embodiment of the present disclosure provides a method, comprising: determining, at a base station, a first information for backhaul link selection of the base station; and broadcasting, from the base station, a first message including the first information for backhaul link selection.

Yet another embodiment of the present disclosure provides a method, comprising: receiving, at a candidate node and from a base station, an information for backhaul link selection of the candidate node; and broadcasting, from the candidate node, the information for backhaul link selection of the candidate node.

Yet another embodiment of the present disclosure provides a non-transitory computer-readable medium having stored thereon computer-executable instructions to cause a processor to implement the above method.

Yet another embodiment of the present disclosure provides an apparatus, comprising: a non-transitory computer-readable medium having stored thereon computer-executable instructions to cause a processor to implement the above method; a receiving circuitry; a transmitting circuitry; and a processor coupled to the non-transitory computer-readable medium, the receiving circuitry and the transmitting circuitry.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
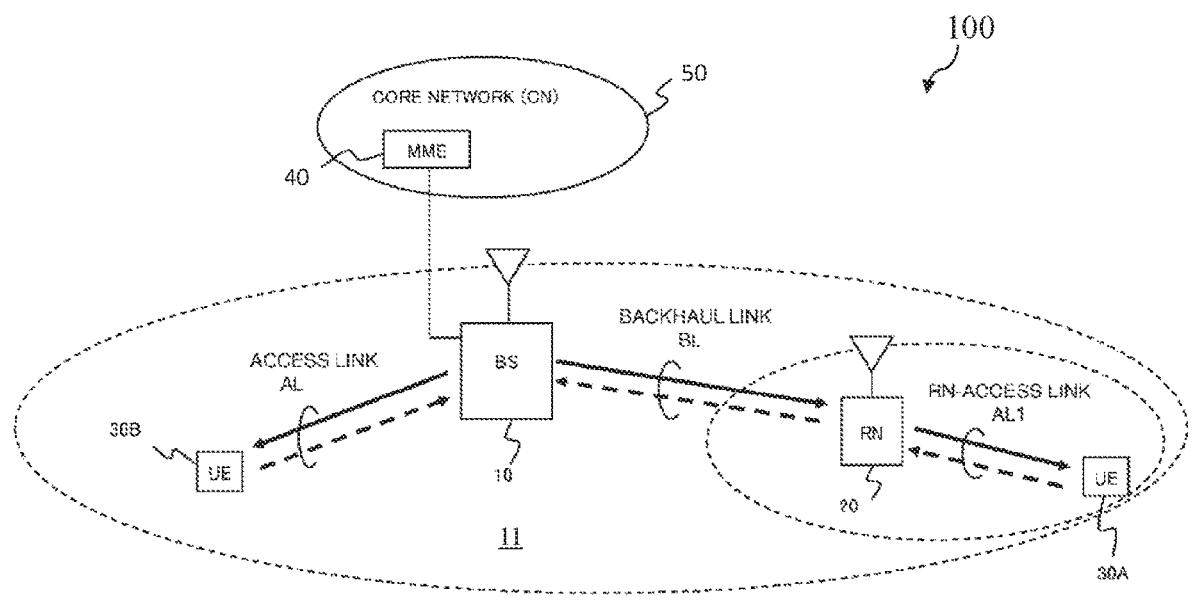
FIG. 1 illustrates a schematic wireless communication system according to an embodiment of the present disclosure.

FIG. 1 illustrates a wireless communication system 100 according to an embodiment of the disclosure.

As shown in FIG. 1, it is assumed for simplicity that the wireless communication system 100 is comprised of a plurality of nodes, including BS 10, RN 20, and a plurality of UEs 30, including UEs 30A and 30B. It should be noted that the wireless communication system 100 may also comprise of a plurality of BSs and/or a plurality of RNs.

The BS 10 operates under the control of a Mobility Management Entity (MME) 40 and is connecting to a Core Network (CN) 50. The core network also includes a Home Subscriber Server (HSS) (not shown), which is in communication with the MME. The BS 10 may be based, for example, on the standards of Long-Term Evolution (LTE), LTE-Advanced (LTE-A), New Radio (NR), or other suitable standards. For example, the BS 10 may be an eNB or a gNB, and may define one or more cells, such as cell 11. UEs 30A and/or 30B may be a computing device, a wearable device, or a mobile device, etc. Persons skilled in the art should understand that as the 3GPP (3rd Generation Partnership Project) and the communication technology develop, the terminologies recited in the specification may change, which should not affect the principle of the disclosure.

BS 10 provides radio protocol Layer-1 (Physical Layer) to Layer-3 (Radio Resource Control (RRC) Layer) connections to the UE 30B and the RN 20 through an Access Link (AL) and a Backhaul Link (BL), respectively. The RN 20 provides radio protocol Layer-1 to Layer-3 connections to the UE 30A through a RN-access link (AL1). Since RN 20 is connected to BS 10 by the backhaul link (BL), the BS 10 and the RN 20 correspond to the above-mentioned Donor BS and RN, respectively. Although FIG. 1 shows that the Donor BS 10 and the RN 20 are respectively connected to a single UE, both Donor BS 10 and RN 20 are capable of providing connections to multiple UEs.

Relaying function enables an operator to improve and extend the coverage of a BS by having RN wirelessly connected to the BS. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e. the backhaul link (BL), also referred to as the Un interface. The relaying function and use of RN/DeNB entities in a network is transparent to the operations of the UEs connected.

The RN supporting the eNB functionality means that it, among other things, terminates the radio protocols of the E-UTRA radio interface, and the S1 and X2 interfaces. From a specification point of view, functionality defined for eNBs, e.g., Radio Network Layer (RNL) and Transport Network Layer (TNL), also apply to RN unless explicitly specified. In addition to the eNB functionality, the RN also supports a subset of the UE functionality, e.g., Physical Layer, Layer-2, RRC, and NAS functionality, in order to wirelessly connect to the DeNB.

Figure 2:
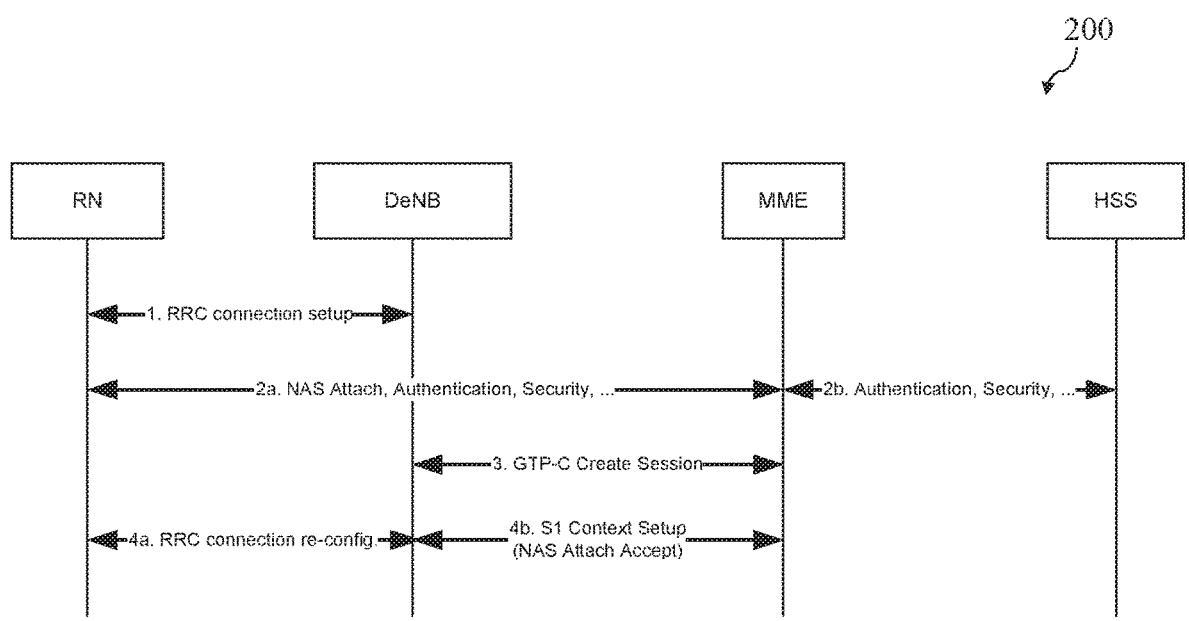
FIG. 2 illustrates a sequence diagram of an exemplary attach procedure for a RN according to an embodiment of the present disclosure.

RN connects to DeNB via the Un interface using the same radio protocols and procedures as a UE connecting to an eNB. FIG. 2 illustrates a sequence diagram of an exemplary attach procedure 200 for RN according to an embodiment of the present disclosure. The procedure is basically the same as the normal UE attach procedure in 3GPP specification TS 23.401 with the following exceptions:

- DeNB is made aware of which MMEs support RN functionality via the S1 Setup Response message earlier received from the MMEs;
- RN sends an RN indication to the DeNB during RRC connection establishment;
- After receiving the RN indication from the RN, the DeNB sends the RN indicator and the IP address of the S-GW/P-GW function embedded in the DeNB, within the Initial UE Message, to an MME supporting RN functionality;
- MME selects S-GW/P-GW for the RN based on the IP address included in the Initial UE Message;
- During the attach procedure, the Evolved Packet Core (EPC) checks if the RN is authorized for relay operation; only if the RN is authorized, the EPC accepts the attachment and sets up a context with the DeNB; otherwise the EPC rejects the attachment.
- RN is preconfigured with information about which cells (DeNBs) it is allowed to access.

3GPP is envisioning an Integrated Access and Backhaul (IAB) architecture for the 5G (NR) communication networks supporting multiple-hop relays. That is, a RN may hop through one or more RNs before reaching the Donor BS. Multi-hop backhauling is beneficial since it provides larger range extension than single-hop backhauling. Higher frequency bands, such as frequency bands above 6 GHz, have limited range of radio signals, and can profit from such larger range extension. Multi-hop backhauling further enables backhauling around obstacles, e.g., buildings in urban environment for in-clutter deployments.

The maximum number of hops in a deployment is expected to depend on a plurality of factors such as frequency, cell density, propagation environment, and traffic load. These factors are expected to change over time.

As the number of hops increases, scalability issues may arise. For example, performance may degrade and/or signaling load may increase to unacceptable levels. Therefore, "scalability to hop-count" is a very important Key Performance Indicator (KPI) for multi-hop network. Generally speaking, at least some the following requirements shall be satisfied to support multi-hop backhauling in IAB architecture designs:

- The architecture should not set limits on the number of backhaul hops;
- The architecture should consider "scalability to hop-count" as an important KPI; and
- Single hop should be considered a special case of multiple backhaul hops.

Figure 3:
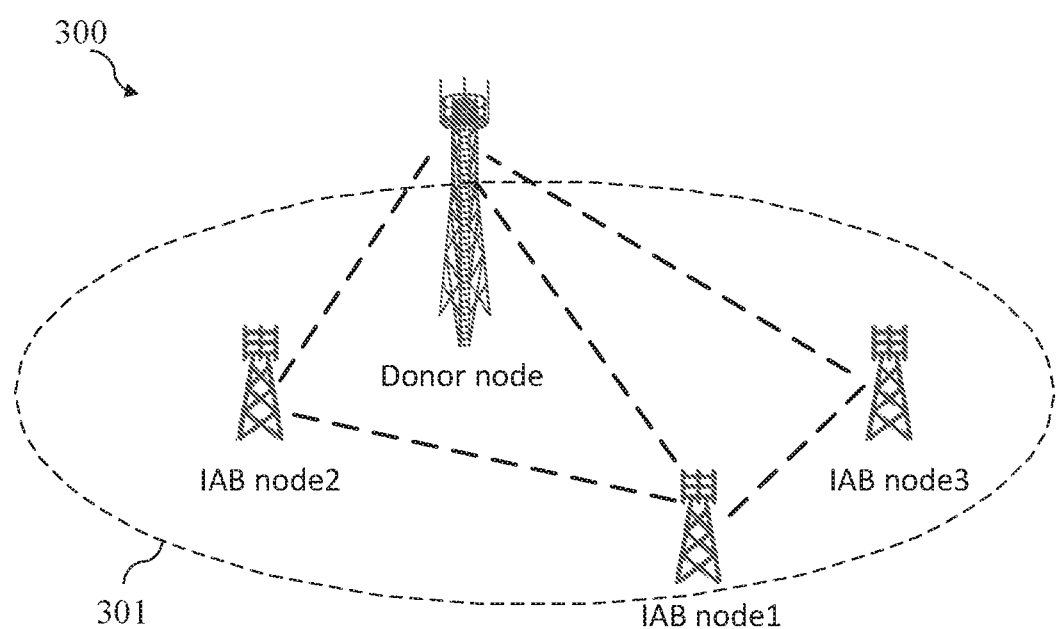
FIG. 3 illustrates a schematic wireless communication system according to an embodiment of the present disclosure.

FIG. 3 illustrates a wireless communication system 300 according to an embodiment of the present disclosure. In FIG. 3, all the relays, i.e., JAB nodes 1-3, are located within the coverage area 301 of the Donor BS, i.e., Donor node, and represents in-coverage RNs.

As shown in FIG. 3, it is assumed for simplicity that IAB nodes 2 and 3 are directly connected to the Donor node. Please note that JAB node 2 or 3 may hop through one or more JAB nodes (not shown) before reaching the Donor node. For example, JAB node 3 may hop through JAB node 3' (not shown) before reaching the Donor node.

During a startup procedure, JAB node 1 may detect the Donor BS, i.e., the Donor node, and its neighboring IAB nodes, e.g., IAB nodes 2 and 3, which have connected to the Donor node. Thus, for IAB node 1, IAB nodes 2 and 3 may act as candidate nodes for multiple-hop backhaul link. Under such circumstance, IAB node 1 would determine whether to access the Donor BS or one of its neighboring IAB nodes. For example, when IAB node 1 is located at the edge of the coverage area 301, the channel between IAB node 1 and the Donor node may have a bad quality condition. However, the channel between IAB node 1 and JAB node 2 or 3 may have a good quality condition. In this case, it would be beneficial if JAB node 1 accesses IAB node 2 or 3 instead of the Donor node.

Embodiments of the present disclosure propose technical solutions for backhaul link selection, which can at least solve the above technical problem in the new generation communication systems, such as 5G communication systems. More details on the embodiments of the present disclosure will be illustrated in the following text in combination with the appended drawings.

Figure 4:
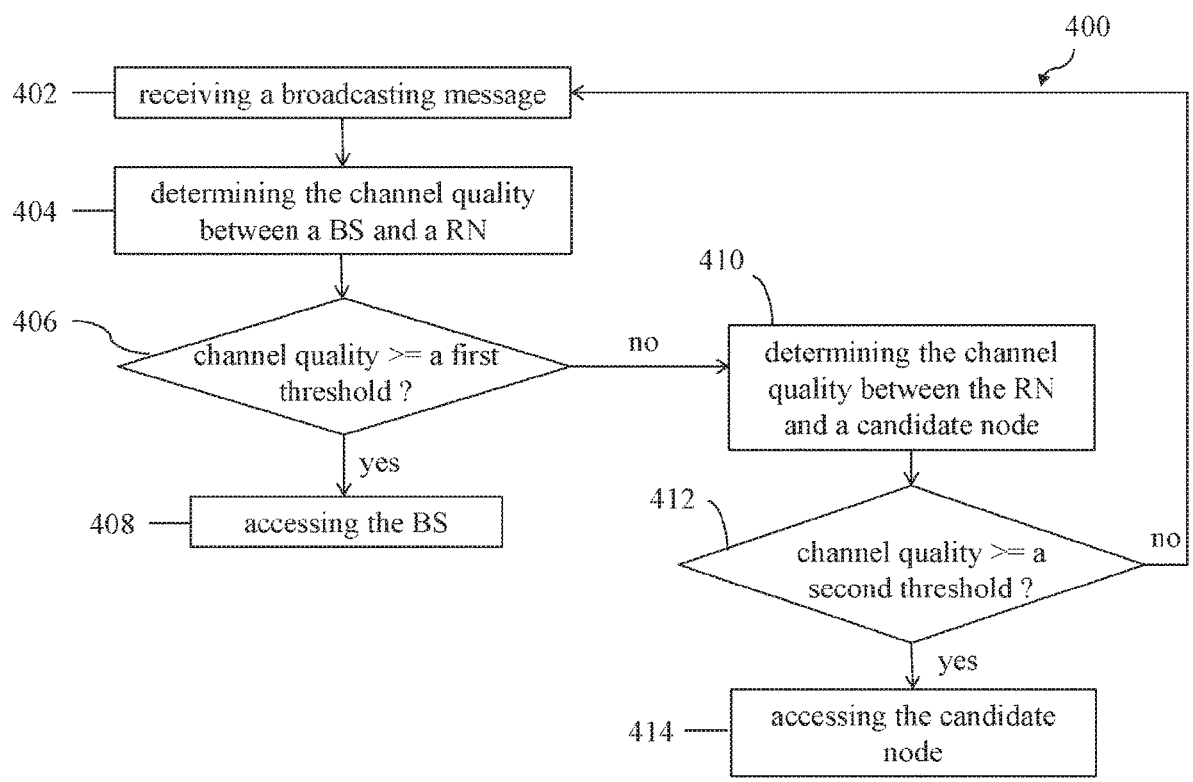
FIG. 4 illustrates a exemplary procedure for backhaul link selection according to a first embodiment of the present disclosure.

FIG. 4 illustrates an exemplary procedure 400 for backhaul link selection of a communication device according to a first embodiment of the present disclosure. The procedure in FIG. 4 may occur during a startup procedure of the communication device, such as a RN. In one embodiment, the RN and the candidate node are IAB nodes. For example, the RN, the candidate node, and the BS may be IAB node 1, IAB node 2, and the Donor node, respectively, in FIG. 3.

At step 402, the RN may receive a broadcasting message from the BS. In some embodiments, the broadcasting message may include information for backhaul link selection. The information may be configured by the BS, and may include, for example, a threshold H1 for backhaul link selection of the BS. In the current embodiment, threshold H1 is a threshold value for a channel quality between the RN and the BS.

At step 404, the RN may determine the channel quality between the BS and the RN. At step 406, the RN may determine whether the channel quality between the RN and the BS is equal to or greater than a first threshold for backhaul link. For example, it is checked whether the channel quality between the RN and the BS is equal to or greater than the threshold H1. If the channel quality between the RN and the BS is equal to or greater than the first threshold for backhaul link, i.e., the channel quality between the RN and the BS is equal to or greater than the threshold H1, the procedure continues with step 408, where the RN accesses the BS. In the other case, if the channel quality between the RN and the BS is less than the first threshold for backhaul link, i.e., the channel quality between the RN and the BS is less than the threshold H1, the procedure continues with step 410, where the RN further determines the channel quality between the RN and a candidate node.

At step 412, the RN may determine whether the channel quality between the RN and the candidate node is equal to or greater than a second threshold for backhaul link. For example, it is checked whether the channel quality between the RN and the candidate node is equal to or greater than a threshold H2 for backhaul link selection. In the current embodiment, threshold H2 is threshold value for a channel quality between the RN and the candidate node. If the channel quality between the RN and the candidate node is equal to or greater than the second threshold for backhaul link, i.e., the channel quality between the RN and the candidate node is equal to or greater than the threshold H2, the procedure continues with step 414, where the RN accesses the candidate node; otherwise, the procedure goes back to step 402.

In some embodiments, there may be a plurality of candidate nodes. For example, as shown in FIG. 3, both IAB nodes 2 and 3 may be candidate nodes for backhaul link selection. In one embodiment, the RN may respectively determine the channel quality between the RN and each of the plurality of candidate nodes at step 410, and may respectively determine whether the channel quality between the RN and each of the plurality of candidate nodes is equal to or greater than a corresponding threshold for backhaul link at step 412.

For example, it is checked whether the channel quality between JAB node 1 and JAB node 2 is equal to or greater than the threshold H2 and whether the channel quality between IAB node 1 and IAB node 3 is equal to or greater than a threshold H3. If the channel quality between IAB node 1 and JAB node 2 is equal to or greater than the threshold H2 and if the channel quality between IAB node 1 and IAB node 3 is less than the threshold H3, JAB node 1 may access IAB node 2 at step 414. If the channel quality between JAB node 1 and IAB node 2 is less than the threshold H2 and if the channel quality between JAB node 1 and JAB node 3 is equal to or greater than the threshold H3, IAB node 1 may access IAB node 3 at step 414. If both the channel quality between JAB node 1 and IAB node 2 and the channel quality between JAB node 1 and IAB node 3 are equal to or greater than the corresponding thresholds for backhaul link, IAB node 1 may access one of the candidate nodes, i.e., IAB nodes 2 and 3, based on additional information.

In some embodiments, the additional information comprises at least one of the load information or latency information associated with corresponding candidate nodes. In one embodiment, IAB node 1 may access IAB node 2 at step 414 if the loading or latency at JAB node 3 is heavier or higher than IAB node 2. Otherwise, JAB node 1 may access JAB node 3 at step 414.

In some embodiments, prior to the determination of whether the channel qualities between the RN and the candidate nodes are equal to or greater than the corresponding thresholds for backhaul link, the RN may receive a broadcasting message including information indicating the threshold H2 or H3. This information may be configured by the BS.

In some embodiments, the broadcasting message is broadcasted by the BS. For example, the RN may receive this broadcasting message at step 402 or anywhere else prior to the determination. In one embodiment, the threshold H2 may be applied to all candidate nodes for backhaul link selection. In this embodiment, the threshold H3 is equal to the threshold H2 and there is no need to broadcast the threshold H3. In some embodiment, the threshold H3 is different from the threshold H2.

In other embodiments, a candidate node may broadcast its own message including corresponding threshold. For example, IAB node 2 may broadcast a message including information indicating the threshold H2 for backhaul link selection of IAB node 2, and IAB node 3 may broadcast a message including information indicating the threshold H3 for backhaul link selection of IAB node 3.

In the above embodiments, it is assumed for simplicity that there may be one or two candidate nodes for backhaul link selection. However, it is contemplated that the above procedure could also be applied to embodiments having three or more candidate nodes for backhaul link selection. It is also contemplated that the candidate nodes in the above embodiments may be connected to the Donor node either directly or through one or more RNs.

Figure 5:
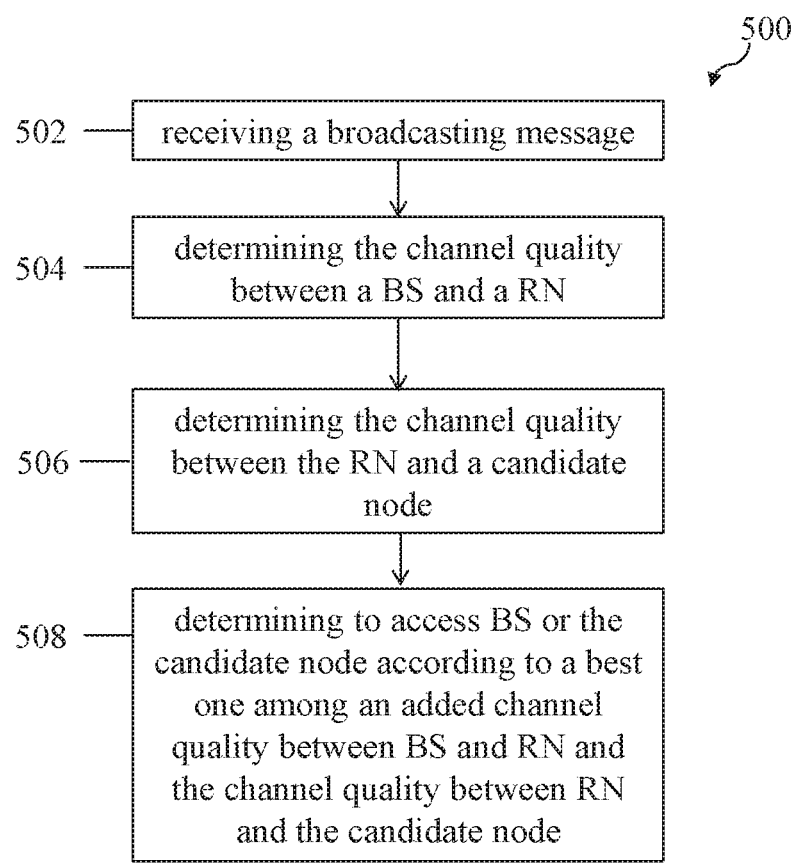
FIG. 5 illustrates a exemplary procedure for backhaul link selection according to a second embodiment of the present disclosure.

FIG. 5 illustrates an exemplary procedure 500 for backhaul link selection of a communication device according to a second embodiment of the present disclosure. The procedure in FIG. 5 may occur during a startup procedure of the communication device, such as a RN. In one embodiment, the RN and the candidate node are IAB nodes. For example, the RN, the candidate node, and the BS may be IAB node 1, IAB node 2, and the Donor node, respectively, in FIG. 3.

At step 502, the RN may receive a broadcasting message from the BS. In some embodiments, the broadcasting message may include information for backhaul link selection. At step 504, the RN may determine the channel quality between the BS and the RN. At step 506, the RN may determine the channel quality between the RN and a candidate node. At step 508, the RN may determine to access the BS or the candidate node based on the channel qualities and the broadcasting message.

In some embodiments, the information for backhaul link selection in the broadcasting message may be configured by the BS, and may include, for example, an offset for backhaul link selection. In these embodiments, step 508 may comprise adding the offset to the channel quality between the RN and the BS, and accessing either the base station or the candidate node according to a best one among the added channel quality and the channel quality between the RN and the candidate node.

For example, IAB node 1 may determine the channel quality between the Donor node and JAB node 1 and add the offset to the determined channel quality. The IAB node 1 may also determine the channel quality between the JAB node 1 and JAB node 2. The JAB node 1 may access the Donor node if the added channel quality is greater than or equal to the channel quality between the JAB node 1 and IAB node 2; otherwise, the JAB node 1 may access IAB node 2.

In some embodiments, there may be a plurality of candidate nodes. The RN may access either the base station or one of the plurality of candidate nodes according to a best channel quality. For example, as shown in FIG. 3, both IAB nodes 2 and 3 may be candidate nodes for backhaul link selection. IAB node 1 may access the Donor node if the channel qualities between JAB node 1 and JAB nodes 2 and 3 is less than the added channel quality. Otherwise, IAB node 1 may access JAB node 2 or 3 if the channel between IAB node 1 and JAB node 2 or 3 has the best channel condition.

Figure 6:
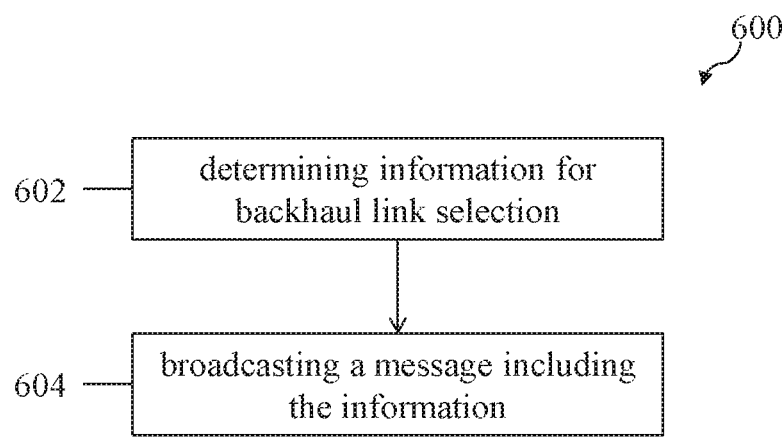
FIG. 6 illustrates an exemplary procedure for backhaul link selection according to a third embodiment of the present disclosure.

FIG. 6 illustrates an exemplary procedure 600 for backhaul link selection of a BS according to an embodiment of the present disclosure. In one embodiment, the BS is a Donor BS, for example, the Donor node in FIG. 3.

At step 602, the BS may determine information for backhaul link selection of the BS. At step 604, the BS may broadcast a message including the information for backhaul link selection.

In some embodiments, the information for backhaul link selection may comprise a threshold (e.g., the threshold H1) for a channel quality between a communication device and the BS. In other embodiments, the information for backhaul link selection may comprise an offset for the channel quality between a communication device and the BS. In one embodiment, the communication device may be IAB node 1 in FIG. 3 or the RN in FIGS. 4 and 5. Details of the threshold H1 and the offset are as described above with respect to FIGS. 4 and 5.

In some embodiments, the procedure 600 may further comprise the following steps: determining a second information for backhaul link selection of a candidate node, and transmitting to the candidate node a second message including the second information for backhaul link selection of the candidate node.

In other embodiments, the procedure 600 may further comprise the following steps: determining a second information for backhaul link selection of a candidate node, and broadcasting a second message including the second information for backhaul link selection of the candidate node.

In the above embodiments, the second information for backhaul link selection of the candidate node comprises a second threshold (e.g., the threshold H2) for the channel quality between the communication device and the candidate node.

In one embodiment, the communication device may be IAB node 1 in FIG. 3 or the RN in FIGS. 4 and 5, and the candidate node may be IAB node 2 or 3 in FIG. 3 or the candidate node in FIGS. 4 and 5. Details of the threshold H2 are as described above with respect to FIG. 4.

Figure 7:
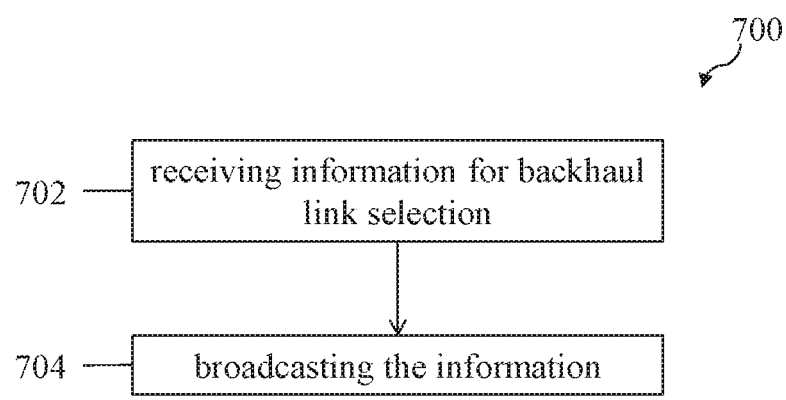
FIG. 7 illustrates an exemplary procedure for backhaul link selection according to a fourth embodiment of the present disclosure.

FIG. 7 illustrates an exemplary procedure 700 for backhaul link selection of a communication device according to an embodiment of the present disclosure. In one embodiment, the communication device is a RN, such as IAB node 2 or 3 in FIG. 3, or the candidate node in FIG. 4.

At step 702, the communication device may receive information for backhaul link selection from a BS. In some embodiments, the information for backhaul link selection may comprise a threshold for a channel quality between the communication device and another communication device. At step 704, the communication device may broadcast the information. In one embodiment, the BS may be the Donor node in FIG. 3 or the BS in FIG. 4, the another communication device may be IAB node 1 in FIG. 3 or the RN in FIG. 4, and the information includes the threshold H2 or H3 as described above.

Figure 8:
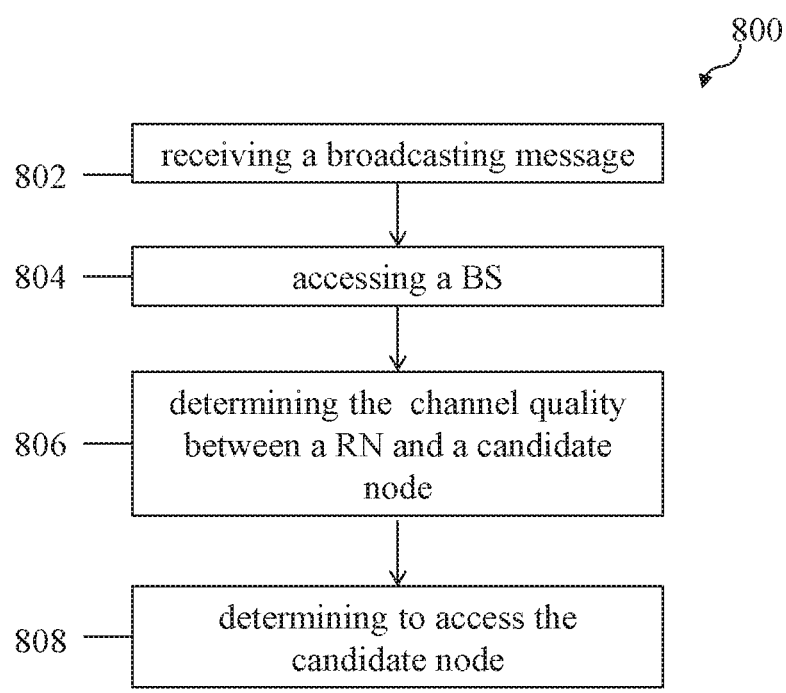
FIG. 8 illustrates a exemplary procedure for backhaul link selection according to a fifth embodiment of the present disclosure.

FIG. 8 illustrates an exemplary procedure 800 for backhaul link selection of a communication device according to a third embodiment of the present disclosure. The procedure in FIG. 8 may occur during a startup procedure of the communication device, such as a RN. In one embodiment, the RN and the candidate node are IAB nodes. For example, the RN, the candidate node, and the BS may be IAB node 1, IAB node 2, and the Donor node, respectively, in FIG. 3.

At step 802, the RN may receive a broadcasting message. The broadcasting message may include information indicating a threshold (e.g., the threshold H2) for backhaul link selection of a candidate node. In some embodiments, the information indicating the threshold for backhaul link selection is configured and broadcasted by the BS. In other embodiments, the information indicating the threshold for backhaul link selection is configured by the BS and broadcasted by the candidate node.

At step 804, the RN may access the BS. If the access to the BS fails, the procedure continues with step 806, where the RN may determine the channel quality between the RN and the candidate node. In some embodiments, the access to the BS may fail if the backhaul link between the RN and the BS fails to satisfy cell selection criteria disclosed in Section 5.2.3.2 of 3GPP specification TS 36.304. For example, in 3GPP TS 36.304, cell selection criteria are defined as follows:

[5.2.3.2 Cell Selection Criterion

For NB-IoT the cell selection criterion is defined in sub-clause 5.2.3.2a.

The cell selection criterion S in normal coverage is fulfilled when:

$Srxlev > 0$ AND $Squal$ $> 0$ where:

$Srxlev = Q_{rxlevmeas} - (Q_{rxlevmin} + Q_{rxlevminoffset}) - P\text{compensa} - Q\text{offset}_{temp}$ $Squal = Q_{qualmeas} - (Q_{qualmin} + Q_{qualminoffset}) - Q\text{offset}_{temp}$ where:

| | |
|---|---|
| Srxlev | Cell selection RX level value (dB) |
| Squal | Cell selection quality value (dB) |
| Qoffset$_{temp}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as |

-continued

| | |
|---|---|
| $Q_{qualminoffset}$ | a result of a periodic search for a higher priority PLMN while camped normally in a VPLMN [5] Offset to the signalled $Q_{qualmin}$ taken into account in the Squal evaluation as a result of a periodic search for a higher priority PLMN while camped normally in a VPLMN [5] |
| Pcompensation | If the UE supports the additionalPmax in the NS-PmaxList, if present, in SIB1, SIB3 and SIB5: max($P_{EMAX1}$ − $P_{PowerClass}$, 0) − (min($P_{EMAX2}$, $P_{PowerClass}$) − min($P_{EMAX1}$, $P_{PowerClass}$)) (dB); else: max($P_{EMAX1}$ − $P_{PowerClass}$, 0) (dB) |
| $P_{EMAX1}$, $P_{EMAX2}$ | Maximum TX power level an UE may use when transmitting on the uplink in the cell (dBm) defined as $P_{EMAX}$ in TS 36.101 [33]. $P_{EMAX1}$ and $P_{EMAX2}$ are obtained from the p-Max and the NS-PmaxList respectively in SIB1, SIB3 and SIB5 as specified in TS 36.331 [3]. |
| $P_{PowerClass}$ | Maximum RF output power of the UE (dBm) according to the UE power class as defined in TS 36.101 [33] |

The signalled values $Q_{rxlevminoffset}$ and $Q_{qualminoffset}$ are only applied when a cell is evaluated for cell selection as a result of a periodic search for a higher priority PLMN while camped normally in a VPLMN [5]. During this periodic search for higher priority PLMN the UE may check the S criteria of a cell using parameter values stored from a different cell of this higher priority PLMN.

If cell selection criterion S in normal coverage is not fulfilled for a cell, UE shall consider itself to be in enhanced coverage if the cell selection criterion S for enhanced coverage is fulfilled, where:

| | |
|---|---|
| $Q_{rxlevmin}$ | UE applies coverage specific value $Q_{rxlevmin\_CE}$ (dBm) |
| $Q_{qualmin}$ | UE applies coverage specific value $Q_{qualmin\_CE}$ (dB) |

If cell selection criterion S in normal coverage is not fulfilled for a cell and UE does not consider itself in enhanced coverage based on coverage specific values $Q_{rxlevmin\_CE}$ and $Q_{qualmin\_CE}$, UE shall consider itself to be in enhanced coverage if UE supports CE Mode B and the cell selection criterion S for enhanced coverage is fulfilled, where:

| | |
|---|---|
| $Q_{rxlevmin}$ | UE applies coverage specific value $Q_{rxlevmin\_CE1}$ (dBm) |
| $Q_{qualmin}$ | UE applies coverage specific value $Q_{qualmin\_CE1}$ (dB) |

For the UE in enhanced coverage, coverage specific values $Q_{rxlevmin\_CE}$ and $Q_{qualmin\_CE}$ (or $Q_{rxlevmin\_CE1}$ and $Q_{qualmin\_CE1}$) are only applied for the suitability check in enhanced coverage (i.e. not used for measurement and reselection thresholds).]

At step 808, the RN may determine to access the candidate node according to the broadcasting message and the channel quality between the RN and the candidate node. In some embodiments, the RN may determine to access the candidate node if the channel quality between the RN and the candidate node is equal to or greater than the threshold for backhaul link selection indicated in the broadcasting message.

In some embodiments, there may be a plurality of candidate nodes. For example, as shown in FIG. 3, both IAB nodes 2 and 3 may be candidate nodes for backhaul link selection. In one embodiment, the RN may respectively determine the channel quality between the RN and each of the plurality of candidate nodes at step 806, and may respectively determine whether the channel quality between the RN and each of the plurality of candidate nodes is equal to or greater than a corresponding threshold for backhaul link.

For example, it is checked whether the channel quality between IAB node 1 and IAB node 2 is equal to or greater than the threshold H2 and whether the channel quality between IAB node 1 and IAB node 3 is equal to or greater than a threshold H3. In one embodiment, the threshold H3 is similarly received as the threshold H2 from a corresponding candidate node. In another embodiment, the threshold H3 is equal to the threshold H2 and there is no need to broadcast the threshold H3.

If the channel quality between IAB node 1 and IAB node 2 is equal to or greater than the threshold H2 and if the channel quality between IAB node 1 and IAB node 3 is less than the threshold H3, IAB node 1 may access JAB node 2 at step 808. If the channel quality between IAB node 1 and IAB node 2 is less than the threshold H2 and if the channel quality between IAB node 1 and IAB node 3 is equal to or greater than the threshold H3, IAB node 1 may access JAB node 3 at step 808. If both the channel quality between IAB node 1 and JAB node 2 and the channel quality between JAB node 1 and IAB node 3 are equal to or greater than the corresponding thresholds for backhaul link, JAB node 1 may access one of the candidate nodes, i.e., IAB nodes 2 and 3, based on additional information.

In some embodiments, the additional information includes at least one of the load information or latency information associated with corresponding candidate nodes. In one embodiment, JAB node 1 may access JAB node 2 at step 808 if the loading or latency at IAB node 3 is heavier or higher than IAB node 2. Otherwise, IAB node 1 may access IAB node 3 at step 808.

In the above embodiments, it is assumed for simplicity that there may be one or two candidate nodes for backhaul link selection. However, there may be three or more candidate nodes for backhaul link selection. In these cases, the above procedure may be similarly applied.

Figure 9:
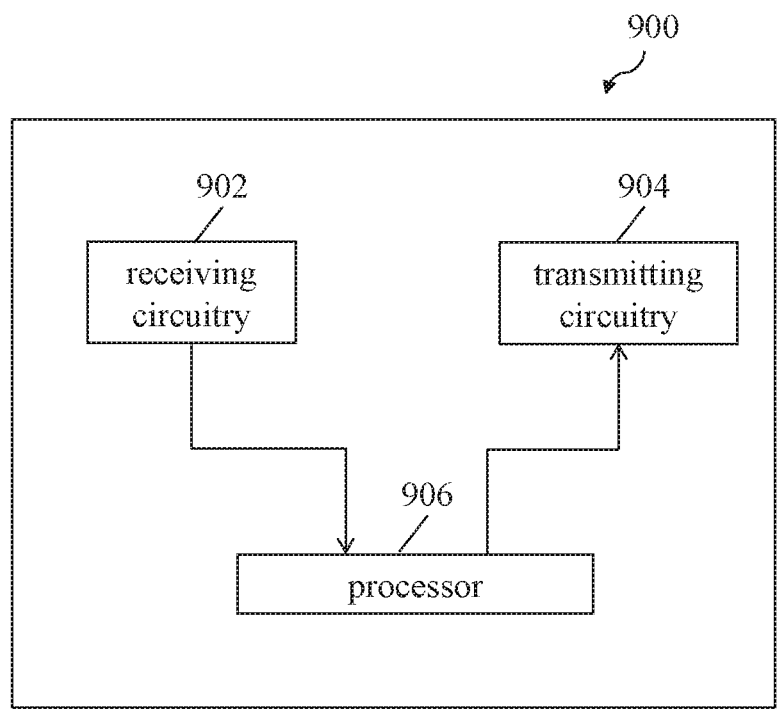
FIG. 9 illustrates an example block diagram of an apparatus according to an embodiment of the present disclosure.

FIG. 9 illustrates a block diagram of an apparatus 900 according to an embodiment of the present disclosure.

As shown in FIG. 9, the apparatus 900 may include a non-transitory computer-readable medium (not shown), a receiving circuitry 902, a transmitting circuitry 904, and a processor 906 coupled to the non-transitory computer-readable medium, the receiving circuitry and the transmitting circuitry. The apparatus 900 may be a base station or a relay. Although in this figure, elements such as processor, transmitting circuitry, and receiving circuitry are described in the singular, the plural is contemplated unless limitation to the singular is explicitly stated. In some embodiments, the receiving circuitry 902 and the transmitting circuitry 904 are combined into a single device, such as a transceiver. In certain embodiments, the apparatus 900 may further include an input device, a memory, and/or other components.

In some embodiments, the non-transitory computer-readable medium may have stored thereon computer-executable instructions to cause a processor to implement the method with respect to the RN as described above. For example, the computer-executable instructions, when executed, cause the processor 906 interacting with receiving circuitry 902 and transmitting circuitry 904, so as to perform the steps with respect to the RNs depicted in FIGS. 4, 5, 7, and 8.

In other embodiments, the non-transitory computer-readable medium may have stored thereon computer-executable instructions to cause a processor to implement the method with respect to the base station as described above. For example, the computer-executable instructions, when executed, cause the processor 906 interacting with receiving circuitry 902 and transmitting circuitry 904, so as to perform the steps with respect to the BS depicted in FIG. 6.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method comprising:
   receiving, at a communication device, a first broadcasting message from a base station, the first broadcasting message including a first information for backhaul link selection, wherein the first information for backhaul link selection includes an offset;
   receiving, at the communication device, a second message from the base station, the second message including second information for backhaul link selection;
   determining a channel quality between the communication device and the base station; and
   determining to access either the base station or a candidate node according to the first broadcasting message, the second message, and the channel quality, wherein determining to access either the base station or the candidate node comprises:
   adding the offset to the channel quality between the communication device and the base station; and
   accessing either the base station or the candidate node according to a best one among the added channel quality and the channel quality between the communication device and the candidate node.

2. The method of claim 1, wherein the first information for backhaul link selection comprises a first threshold, and the step of determining to access either the base station or the candidate node comprises accessing the base station at the communication device if the channel quality between the communication device and the base station is equal to or greater than the first threshold.

3. The method of claim 2, further comprising:
   determining the channel quality between the communication device and the candidate node.

4. The method of claim 3, wherein the step of determining to access either the base station or the candidate node further comprises accessing the candidate node at the communication device if the channel quality between the communication device and the base station is less than the first threshold and the channel quality between the communication device and the candidate node is equal to or greater than a second threshold included in the second information for backhaul link selection.

5. The method of claim 3, wherein the first information and the second information are both configured and broadcasted by the base station.

6. A method comprising:
   receiving, at a communication device, a broadcasting message including information indicating a threshold for backhaul link selection of a candidate node;
   accessing, at a communication device, a base station; and
   if the access to the base station fails, determining channel quality between the communication device and the candidate node, and determining to access the candidate node according to the threshold and the channel quality between the communication device and the candidate node.

7. The method of claim 6, wherein the step of determining to access the candidate node comprises determining to access the candidate node if the channel quality between the communication device and the candidate node is equal to or greater than the threshold for backhaul link selection.

8. The method of claim 6, the information indicating the threshold for backhaul link selection is configured and broadcasted by the base station.

9. The method of claim 6, the information indicating the threshold for backhaul link selection is configured by the base station and broadcasted by the candidate node.

10. A method comprising:
    determining, at a base station, a first information for backhaul link selection of the base station;
    broadcasting, from the base station, a first message including the first information for backhaul link selection;
    determining, at the base station, a second information for backhaul link selection of a candidate node; and
    transmitting, from the base station and to the candidate node, a second message including the second information for backhaul link selection of the candidate node.

11. The method of claim 10, wherein the first information for backhaul link selection of the base station comprises a first threshold for a channel quality between a communication device and the base station.

12. The method of claim 10, wherein the second information for backhaul link selection of the candidate node comprises a second threshold for a channel quality between a communication device and the candidate node.

13. The method of claim 10, wherein the first information for backhaul link selection of the base station comprises an offset for the channel quality between a communication device and the base station.

14. A method comprising:
   receiving, at a candidate node and from a base station, an information for backhaul link selection of the candidate node; and
   broadcasting, from the candidate node, the information for backhaul link selection of the candidate node.

15. The method of claim 14, wherein the information for backhaul link selection comprises a threshold for a channel quality between a communication device and the candidate node.

\* \* \* \* \*